US009178875B2

(12) United States Patent
Lu et al.

(10) Patent No.: US 9,178,875 B2
(45) Date of Patent: Nov. 3, 2015

(54) METHOD FOR AUTHENTICATING AN OTP AND AN INSTRUMENT THEREFOR

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 199 days.

(21) Appl. No.: 13/824,666

(22) PCT Filed: Dec. 21, 2012

(86) PCT No.: PCT/CN2012/087116
§ 371 (c)(1),
(2) Date: Mar. 18, 2013

(87) PCT Pub. No.: WO2013/163884
PCT Pub. Date: Nov. 7, 2013

(65) Prior Publication Data
US 2014/0082710 A1    Mar. 20, 2014

(30) Foreign Application Priority Data
May 3, 2012 (CN) .......................... 2012 1 0135494

(51) Int. Cl.
H04L 29/06 (2006.01)
H04L 9/32 (2006.01)
G06F 21/31 (2013.01)

(52) U.S. Cl.
CPC ............ H04L 63/0838 (2013.01); G06F 21/31 (2013.01); H04L 9/3228 (2013.01)

(58) Field of Classification Search
USPC .............. 726/6, 2, 21, 36; 713/150, 163, 181; 380/255, 264, 276
See application file for complete search history.

(56) References Cited

U.S. PATENT DOCUMENTS

2007/0250923 A1* 10/2007 M'Raihi ......................... 726/18
2008/0034216 A1*  2/2008 Law ............................... 713/183
2011/0321146 A1   12/2011 Vernon et al.

* cited by examiner

Primary Examiner — Jason K. Gee
Assistant Examiner — Sharif E Ullah
(74) Attorney, Agent, or Firm — Hammer & Associates, P.C.

(57) ABSTRACT

A method for authenticating an OTP (one time password) and an instrument therefor, in which the method includes determining whether the OTP token is authenticated successfully, if the OTP token is not authenticated successfully, setting size of an authentication window to be a first predetermined time length and authenticating the obtained OTP according to the authentication window; if the OTP token is authenticated successfully, determining whether the interval between the authentication success time and the current system time is longer than a second predetermined time length, if yes, setting size of the authentication window to be a third predetermined time length and authenticating the obtained OTP according to the authentication window and the authentication success time, in which the third predetermined time length is shorter than the first predetermined time length; otherwise, setting size of the authentication window to be a fourth predetermined time length and authenticating the obtained OTP according to the authentication window and the authentication success time, in which the fourth time length is shorter than the third predetermined time length. The invention can ensure both the authentication success rate and the authentication security.

18 Claims, 3 Drawing Sheets

METHOD FOR AUTHENTICATING AN OTP AND AN INSTRUMENT THEREFOR

TECHNICAL FIELD

Figure 1A:
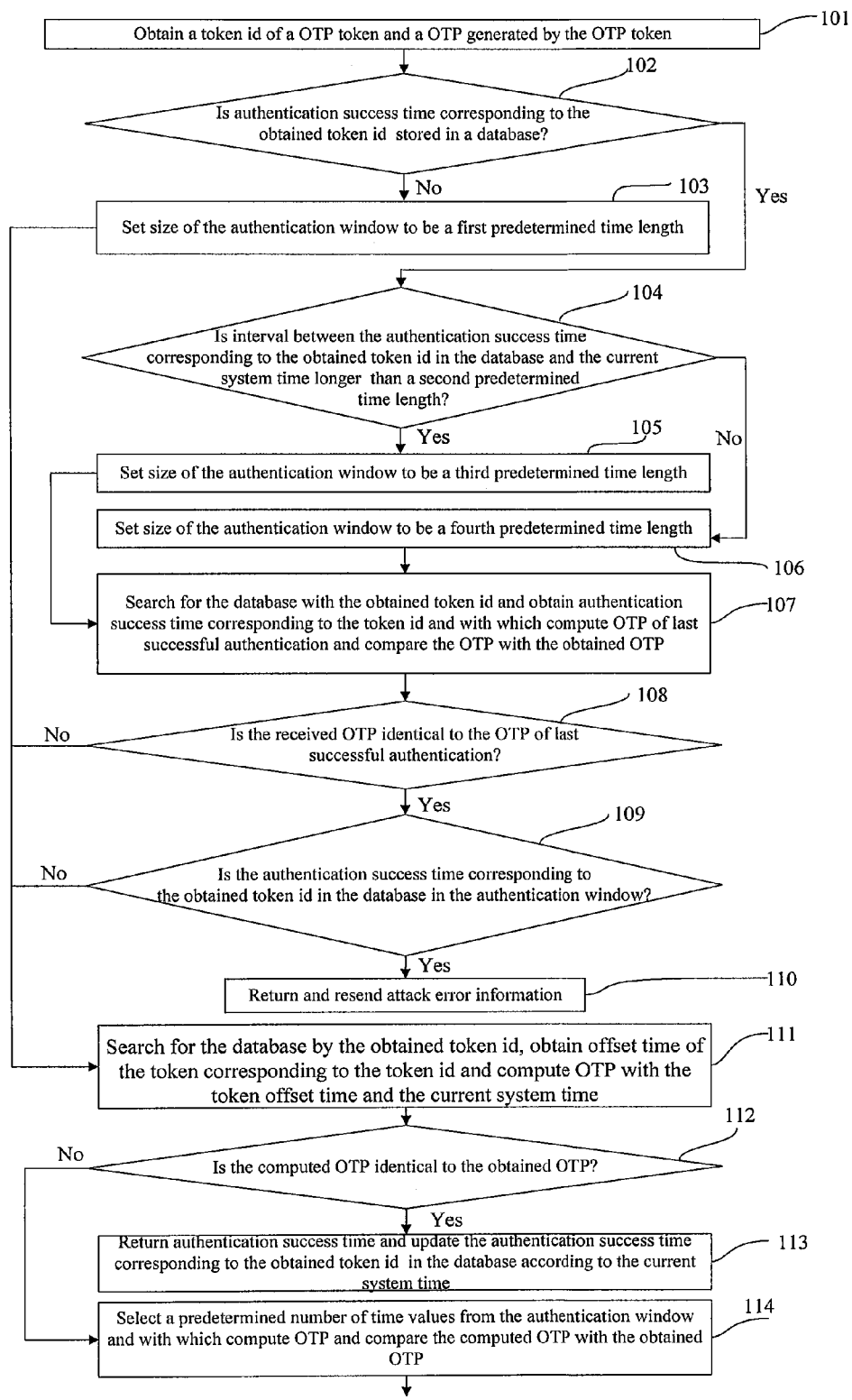

The invention relates to information security field and in particularly relates to a method for authenticating the OTP (One Time Password) and an instrument therefor.

PRIOR ART

OTP token (OTP Token) is a portable electronic product for generating the OTP, which generates the OTP based on time, event and challenge/response factors etc., and eliminates a potential risk of intercepting, guessing, attacking and cracking a static password. The OTP token can be used offline or online.

The OTP token based on time synchronization generates a time-related and unpredictable random number every sixty seconds, and uses the random number to authenticate. Because the OTP token synchronizes based on international standard time, and thus requires a server to maintain correct clock precisely and is strict on crystal frequency of the token, and therefore reduces possibility for system to be not synchronous.

Due to different working environments for the OTP token, unsure offset and damage on the clock pulse may be easy to occur in magnetic field, high temperature, high voltage, vibration and underwater place, which lead to authentication failure of the OTP. In the prior art, in order to improve authentication success rate, authentication window can be widened and in order to improve authentication security, authentication window can also be narrowed.

In process of realizing the invention, inventors find the following shortcomings:

in order to improve authentication success rate, the authentication window is widened which reduces authentication security; while in order to improve authentication security, the authentication window is narrowed which leads to authentication failure due to a little offset.

SUMMARY OF THE INVENTION

The embodiments of the present invention relate to a method for authenticating the OTP and a device for authenticating the OTP, so as to ensure both the authentication success rate and the authentication security.

A method for authenticating an OTP, comprising:

Step 1, obtaining a token ID of an OTP token and the OTP generated by the OTP token;

Step 2, determining whether the OTP token is authenticated successfully, if the OTP token is not authenticated successfully, going to Step 3; if the OTP token is authenticated successfully, going to Step 4;

Step 3, setting size of an authentication window to be a first predetermined time length and authenticating the obtained OTP according to the authentication window;

Step 4, obtaining authentication success time corresponding to the token ID in a database, and determining whether a time interval between the authentication success time and the current system time is longer than a second predetermined time length, if yes, going to Step 5, otherwise, going to Step 6;

Step 5, setting size of the authentication window to be a third predetermined time length and authenticating the obtained OTP according to the authentication window and the authentication success time in which the third predetermined time length is shorter than the first predetermined time length; and Step 6, setting size of the authentication window to be a fourth predetermined time length and authenticating the obtained OTP according to the authentication window and the authentication success time in which the fourth predetermined time length is shorter than the third predetermined time length.

A device for authenticating an OTP, characterized in that, said device comprises:

an obtaining module configured to obtain a token ID of an OTP token and the OTP generated by the OTP token;

a first determining module configured to determine whether the OTP token has been authenticated successfully;

a second determining module configured to determine whether an interval between authentication success time corresponding to the token ID in the database and the current system time is longer than a second predetermined time in case that the first determining module determines that the OTP token has been authenticated successfully;

a setting module configured to set size of an authentication window to be a first predetermined time length in case that the first determining module determines that the OTP token has not been authenticated successfully; to set size of the authentication window to be a third predetermined time length in case that the second determining module determines that interval between the authentication success time and the current system time is longer than a second predetermined time length; to set size of the authentication window to be a fourth predetermined time length in case that the second determining module determines that interval between the authentication success time and the current system time is not longer than the second predetermined time length, in which the fourth predetermined time length is shorter than the third predetermined time length;

a first authenticating module configured to authenticate the OTP obtained according to the authentication window in case that the first determining module determines that the OTP has not been authenticated successfully; and a second authenticating module configured to authenticate the OTP obtained according to the authentication window and the authentication success time in case that the first determining module determines that the OTP token has been authenticated successfully.

According to the present invention, setting size of the authentication window according to whether the authentication success time and the interval between the authentication success time and the current system time are stored in the database and authenticating the obtained OTP according to the set authentication window, therefore, the present invention can ensure both the authentication success rate and the authentication security.

BRIEF DESCRIPTION OF THE ACCOMPANYING DRAWINGS OF THE INVENTION

Figure 1B:
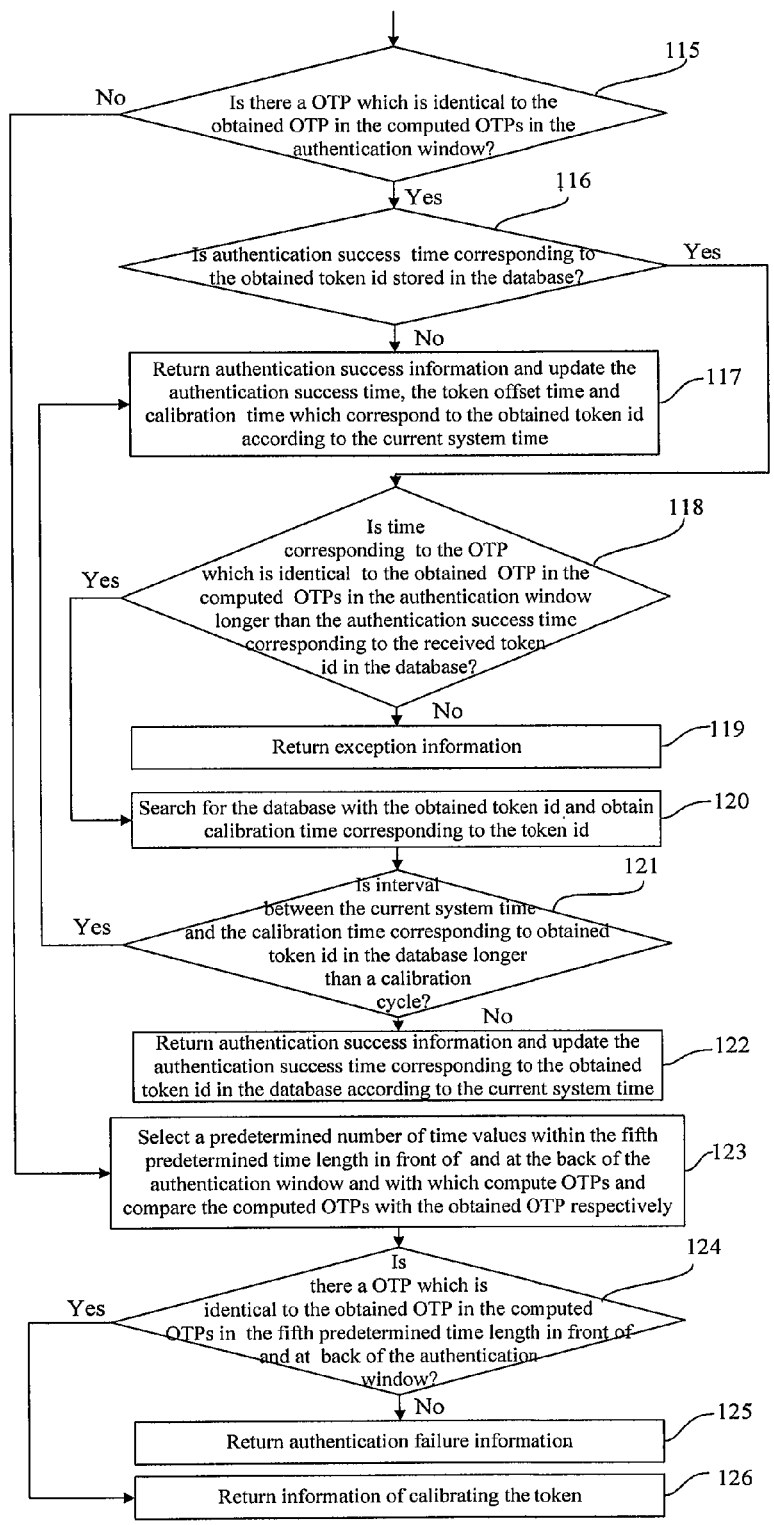
Figure 2:
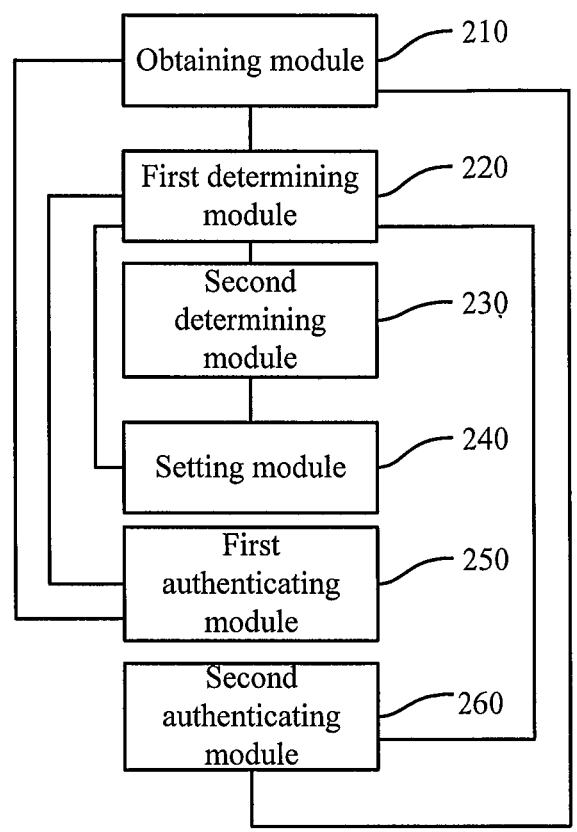

FIG. 1A and FIG. 1B compose a flow chart of a method for authenticating the OTP provided by an embodiment of the invention; and FIG. 2 illustrates a structural diagram of an instrument of authenticating the OTP provided by an embodiment of the invention.

PREFERRED EMBODIMENTS OF THE INVENTION

A clear and complete description will be given of solution of the embodiment of the invention in combination with drawings of embodiment of the invention. Obviously, the embodiment described is just part of the embodiments, not all the embodiments. Based on the embodiment of the invention, all other embodiments obtained by those skilled in the art without involving an inventive step will fall within scope of protection of the invention.

The invention provides a method for authenticating OTP, as illustrated in FIG. 1A and FIG. 1B, including following steps.

Step 101, obtain a token ID of the OTP token and the OTP generated by the OTP token. Specifically, Step 101 comprises obtaining a token ID input by a user or obtaining a token ID corresponding to a user name after searching for a database according to the user name input by a user.

For example, Step 101 comprises obtaining the token ID "1224A" input by the user, or obtaining a token ID "1224A" corresponding to the user name after searching for a database according to the a user name "steven" input by a user.

Step 102, determine whether authentication success time corresponding to the token ID obtained is stored in the database, if yes, go to Step 104; otherwise, go to Step 103.

Specifically, Step 102 includes searching for the database according to the token ID obtained, if the authentication success time corresponding to the token ID obtained is not stored in the database, the OTP token corresponding to the token ID is not authenticated successfully; otherwise, the OTP token corresponding to the token ID is authenticated successfully. The authentication success time may be a system time of the last successful authentication of the OTP token corresponding to the token ID.

Step 103, set size of an authentication window to be a first predetermined time length and go to Step 111.

The authentication window is a time range of authenticating the OTP, which locates in front of and at the back of the current system time plus the token offset time. When authenticating the OTP, the step may comprise computing the OTP by a time value selected from the authentication window and comparing the OTP computed with the OTP obtained.

The authentication window includes a front window edge and a back window edge, in which the front window edge is a time range taking the current system time plus the token offset time as an ending point and the back window edge is a time range taking the current system time plus the token offset time as a starting point. Size of the front window edge may be identical to or different from size of the back window edge.

For example, the first predetermined time length may be 20 minutes, and size of the front window edge and size of the back window edge may be both 10 minutes or one 8 minutes and one 12 minutes.

Step 104, determine whether interval between the authentication success time corresponding to the token ID obtained in the database and the current system time is longer than a second predetermined time length, if yes, go to Step 105, otherwise, go to Step 106.

Step 105, set size of the authentication window to be a third predetermined time length and go to Step 107.

Step 106, set size of the authentication window to be a fourth predetermined time length.

The first predetermined time length may be longer than the third predetermined time length and the third predetermined time length may be longer than the fourth predetermined time length. For example, if the authentication success time corresponding to the token ID obtained in the database is 15:30 on Mar. 3, 2012 and the second predetermined time length is 2 weeks and the current system time is 15:30 on Mar. 18, 2012, it is determined that interval between the authentication success time and the current system time is longer than the second predetermined time length, size of the authentication window is set to be the third predetermined time length, for example, 4 minutes. If the current system time is 15:30 on Mar. 13, 2012, it is determined that interval between the authentication success time and the current system time is shorter than the second predetermined time length, size of the authentication window is set to be the fourth predetermined time length, for example, 2 minutes.

Step 107, check for the database according to the token ID obtained, obtain the authentication success time corresponding to the token ID, compute an OTP of last successful authentication according to the authentication success time and compare the OTP computed with the OTP obtained.

Specifically, Step 107 includes taking the authentication success time corresponding to the token ID obtained as a parameter and computing the OTP of last successful authentication by the OTP token corresponding to the token ID.

Step 108, determine whether the OTP obtained is identical to the OTP of last successful authentication, if they are identical, go to Step 109; otherwise, go to Step 111.

Step 109, determine whether the authentication success time corresponding to the token ID obtained in the database is in the authentication window, if yes, go to Step 110; otherwise, go to Step 111.

Step 110, return and resend attack error information.

For example, if the authentication success time corresponding to the token ID obtained in the database is 15:30 on Mar. 3, 2012 and the current system time is 15:31 on Mar. 3, 2012 and the token offset time is 0 and size of the authentication window is 4 minutes, the front window edge is identical to the back window edge in size, which is that, if the authentication window ranges from 15:29 on Mar. 3, 2012 to 15:33 on Mar. 3, 2012, it is determines that the authentication success time is in the authentication window and attack error information is returned and resent.

Step 111, check for the database according to the token ID obtained, obtain a token offset time corresponding to the token ID and compute the OTP according to the token offset time and the current system time.

Specifically, Step 111 includes taking the token offset time plus the current system time as a base time and compute the OTP. The token offset time may be a difference between the OTP token time and the current system time, and initial value of the token offset time may be a default value, for example 0, which is that, if the OTP token has not been calibrated, the token offset time corresponding to the OTP token may be a default value; while if the OTP token has been calibrated, the token offset time corresponding to the OTP token may be not the default value.

For example, if the current system time is 15:31 on Mar. 3, 2012 and the token offset time is −30 seconds, take 15:30:30 on Mar. 3, 2012 as the base time to compute the OTP.

Step 112, determine whether the OTP computed is identical to the OTP obtained, if yes, go to Step 113; otherwise, go to Step 114.

Step 113, return authentication success information and update the authentication success time corresponding to the token ID obtained in the database.

Specifically, if the authentication success time corresponding to the token ID obtained is stored in the database, set the authentication success time to be the current system time; while if the authentication success time corresponding to the token ID obtained is not stored in the database, take the current system time as the authentication success time corresponding to the token ID obtained and store the same in the database.

Step 114, select a predetermined number of time values from the authentication window and compute OTPs according to the time values selected and compare the OTPs computed with the OTP obtained, respectively.

Specifically, define a range of the authentication window according to the current system time, the token offset time and size of the authentication window and select a predetermined number of time values from the authentication window, take the selected time values as base times to compute OTPs respectively and obtain predetermined number of OTPs.

If size of the front window edge of the authentication window is identical to that of the back window edge of the authentication window, set the current system time plus the token offset time as a middle point of the authentication window and define the range of the authentication window according to the size of the authentication window; while if size of the front window edge of the authentication window is different from size of the back window edge of the authentication window, define a starting point of the authentication window according to the current system time plus the token offset time as well as size of the front window edge, define an ending point of the authentication window according to the current system time plus the token offset time as well as size of the back window edge, and thus define range of the authentication window.

For example, if the authentication window is 4 minutes and size of the front window edge is 1 minute and size of the back window edge is 3 minutes and the current system time is 15:31 on Mar. 3, 2012 and the token offset time is −1 minute and the predetermined step is 1 minute, it is determined that the current system time plus the token offset time is 15:30 on Mar. 3, 2012, further determined that the starting point of the authentication window is 15:29 on Mar. 3, 2012, the ending point of the authentication window is 15:33 on Mar. 3, 2012. Five time values can be selected from the authentication window, respectively 15:29 on Mar. 3, 2012; 15:30 on Mar. 3, 2012; 15:31 on Mar. 3, 2012; 15:32 on Mar. 3, 2012; 15:33 on Mar. 3, 2012. Take the selected five time values as base times and compute OTPs respectively and thus five OTPs are obtained.

Step 115, determine whether there is the OTP identical to the OTP obtained in the OTPs computed within the authentication window, if there is OTP identical to the OTP obtained in the OTPs computed within the authentication window, go to Step 116; otherwise, go to Step 123.

Step 116, determine whether authentication success time corresponding to the token ID obtained is stored in the database, if yes, go to Step 118; otherwise go to Step 117.

Specifically, detail of Step 116 is identical to that of Step 102.

Step 117, return authentication success information and update the authentication success time, token offset time and calibration time which all correspond to the token ID obtained according to the current system time.

Specifically, Step 117 includes storing the current system time as the authentication success time and the calibration time which both correspond to the obtained token ID in the database, in which the calibration time is a time when the OTP token corresponding to the token ID obtained was last calibrated, also is a time when the offset time of the token corresponding to the token ID obtained is updated, and initial value of the time may be a default value, for example 0, which is that, if the OTP token has not been calibrated, the calibration time of the OTP token is a default value while if the OTP token has been calibrated, the calibration time of the OTP token is not a default value.

Moreover, Step 117 includes setting a token offset time corresponding to the token ID obtained according to a difference between time corresponding to the OTP, which is identical to the obtained OTP, in the computed OTPs in the authentication window and the current system time and storing the token offset time in the database.

For example, if the current system time is 15:31 on Mar. 3, 2012 and the time corresponding to the OTP, which is identical to the obtained OTP, of the computed OTPs in the authentication window is 15:32 on Mar. 3, 2012, 15:31 on Mar. 3, 2012 is stored in the database respectively as the authentication success time corresponding to the obtained token ID and the calibration time, and a difference between 15:32 on Mar. 3, 2012 and 15:31 on Mar. 3, 2012 is set to be the token offset time corresponding to the obtained token ID, for example +1 minute, and the token offset time is stored in the database.

Step 118, determine whether time corresponding to the OTP, which is identical to the OTP obtained, of the computed OTPs in the authentication window is longer than the authentication success time corresponding to the token ID obtained in the database, if yes, go to Step 120; otherwise, go to Step 119.

Step 119, return exception information.

For example, OTPs computed in the authentication window are respectively A, B, C, D and E, the time values corresponding to the OTPs computed are respectively 15:29 on Mar. 3, 2012; 15:30 on Mar. 3, 2012; 15:31 on Mar. 3, 2012; 15:32 on Mar. 3, 2012 and 15:33 on Mar. 3, 2012. If the OTP obtained is A and the authentication success time corresponding to the token ID obtained in the database is 15:29 on Mar. 3, 2012, it is determined that the time corresponding to the OTP, which is identical to the OTP obtained, of the OTPs computed in the authentication window is 15:29 on Mar. 3, 2012, and the time equals to the authentication success time corresponding to the token ID obtained in the database and an error is returned.

Step 120, check for the database according to the token ID obtained and obtain a calibration time corresponding to the token ID.

Initial value of the calibration time is 0, which is that, if the OTP token has not been calibrated, the calibration time corresponding to the OTP token is 0 while if the OTP token has been calibrated, the calibration time corresponding to the OTP token is not 0.

Step 121, determine whether interval between the current system time and the calibration time corresponding to the token ID obtained in the database is longer than a calibration cycle, if yes, go to Step 117; otherwise, go to Step 122.

For example, if the calibration time corresponding to the token ID obtained in the database is 15:00 on Jun. 3, 2011 and the current system is 15:31 on Mar. 3, 2012 and the calibration cycle is half a year, it is determined that the interval between the current system and the calibration time corresponding to the token ID obtained in the database is longer than the calibration cycle.

Step 122, return authentication success information and update the authentication success time corresponding to the token ID obtained in the database according to the current system time.

Specifically, the authentication success time corresponding to the token ID obtained in the database can be updated to the current system time.

For example, if the calibration time corresponding to the token ID obtained in the database is 15:00 on Jun. 3, 2011 and the current system time is 15:31 on Mar. 3, 2012 and the calibration cycle is one year, it is determined that the interval between the current system and the calibration time corresponding to the token ID obtained in the database is shorter than the calibration cycle and the authentication success time is returned and 15:31 on Mar. 3, 2012 is stored in the database as an authentication success time corresponding to the token ID obtained.

Step 123, select a predetermined number of time values from a fifth predetermined time length in front of and at the back of the authentication window, compute OTPs according to the time values selected and compare the OTPs computed with the OTP obtained.

Specifically, Step 123 includes selecting a predetermined number of time values from the fifth predetermined time length in front of and at the back of the authentication window according to a predetermined step size, taking the time values selected as base times and with which computing OTPs so as to obtain a predetermined number of OTPs.

For example, if size of the authentication window is 4 minutes and size of the front window edge and size of the back window edge are identical and the current system time is 15:31 on Mar. 3, 2012 and the token offset time is −1 minute and the fifth predetermined time length is 2 minutes and the predetermined step is 1 minute, it is determined that the authentication window ranges from 15:28 on Mar. 3, 2012 to 15:32 on Mar. 3, 2012, the fifth predetermined time length in front of and at the back of the authentication window ranges from 15:26 on Mar. 3, 2012 to 15:28 on Mar. 3, 2012 and from 15:32 on Mar. 3, 2012 to 15:34 on Mar. 3, 2012 and selecting 4 time values from the fifth predetermined time length: 15:26 on Mar. 3, 2012, 15:27 on Mar. 3, 2012, 15:33 on Mar. 3, 2012 and 15:34 on Mar. 3, 2012, taking the time values selected as base times and with which computing OTPs so as to obtain 4 OTPs.

Step 124, determine whether the OTP in the OTPs computed within the fifth predetermined time length in front of and at the back of the authentication window is identical to the OTP obtained, if yes, go to Step 126; otherwise, go to Step 125.

Step 125, return authentication failure information.

Specifically, Step 125 includes returning an invalid OTP which indicates authentication failure. For example, if the OTPs computed within the fifth predetermined time length in front of and at the back of the authentication window include F, G, H and I and the OTP obtained is L, it is determined that there is not the OTP in the OTPs computed within the fifth predetermined time length in the front of and at the back of the authentication window which is identical to the OTP obtained, and authentication failure information is returned.

Step 126, return information of needing to calibrate the token.

In the solution provided by the embodiments of the invention, setting size of the authentication window according to whether the authentication success time and interval between the authentication success time and the current system time are stored in the database, and authenticating the OTP obtained according to the authentication window after being set ensure both the authentication success rate and the authentication security.

It is noted that, in another embodiment of the invention, a variable may be set and if it is determined that the authentication success time corresponding to the token ID obtained is stored in the database in Step 102, value of the variable is set to be a first predetermined value; if it is determined that the authentication success time corresponding to the token ID obtained is not stored in the database, value of the variable is set to be a second predetermined value. Correspondingly, if it is determined that the OTP in the OTPs computed in the authentication window is identical to the OTP obtained, determine value of the variable, and if value of the variable is the first predetermined value, determine whether time corresponding to the OTP in the OTPs computed in the authentication window which is identical to the OTP obtained, is longer than the authentication success time corresponding to the obtained token ID in the database; if value of the variable is the second predetermined value, return authentication success information and update the authentication success time, token offset time and calibration time which all correspond to the obtained token ID according to the current system time, as shown in Step 117. The above flow also can achieve the object of the invention.

In another embodiment of the invention, the authentication success time corresponding to different OTP tokens can be stored in the database, and if the OTP token is not authenticated successfully, the authentication success time corresponding to the OTP token is a default value, for example 0; if the OTP token is authenticated successfully, the authentication success time corresponding to the OTP token is the current system time of the OTP token of last successful authentication. Based on this policy, the determination can be completed by determining whether the authentication success time corresponding to the obtained token ID is a default value, if the authentication success time corresponding to the obtained token ID is a default value, it is determined that the OTP token has not been authenticated successfully; otherwise, it is determined that the OTP token has been authenticated successfully. The above determination method can also achieve the object of the invention.

In another embodiments of the invention, all authentication IDs corresponding to the different OTP tokens can be stored, if the OTP token has not been authenticated successfully, the authentication ID corresponding to the OTP token is set to be a first predetermined value; if the OTP token has been authenticated successfully, the authentication ID corresponding to the OTP token is set to be a second predetermined value. Based on the policy, the authentication ID corresponding to the OTP token is obtained, if value of the authentication ID is the first predetermined value, it is determined that the OTP token has not been authenticated successfully; if value of the authentication ID is the second predetermined value, it is determined that the OTP token has been authenticated successfully.

In another embodiments of the invention, if the OTP token has been authenticated successfully, upon setting size of the authentication window, the method may include determining whether the authentication window contains the authentication success time corresponding to the OTP token, if yes, size of the authentication window is set continuously till the authentication window does not contain the authentication success time corresponding to the OTP token. Based on the above policy, if the time values selected from the authentication window are all longer than the authentication success time, it is not necessary to further determine whether time corresponding to the existed OTP is longer than the authentication success time in the process of determining the OTP of the OTPs computed in the authentication window is identical to the OTP obtained, as described in Step 118, but obtain calibration time corresponding to the token ID obtained from the database directly as described in Step 120 and go to steps following Step 120. The above method also achieves the object of the invention.

With the same reasons, based on the above setting method, if the OTP obtained is identical to the OTP of last successful authentication, it is not necessary to determine whether interval between the authentication success time corresponding to the obtained token ID in the database and the current system time is in the authentication window, as described in Step 109, but obtain the token offset time corresponding to the token ID directly, compute the OTP according to the token offset time and the current system time, as described in Step 111, and go to steps following Step 111. The method can also achieve the object of the invention.

In another embodiments, when computing OTPs within the authentication window, the method may include selecting a predetermined number of time values which are longer than the authentication success time corresponding to the obtained token ID, computing OTPs according to the selected time values, and when determining that there is the OTP in the OTPs computed which is identical to the obtained OTP, it is not necessary to determine whether time corresponding to the OTP which is identical to the obtained OTP is longer than the authentication success time, as described in Step 118, but obtain calibration time corresponding to the token ID directly from the database, as described in Step 120 and execute the following steps which are steps following Step 120.

The embodiments of the invention also provide an instrument or device for authenticating the OTP, as illustrated in FIG. 2, including an obtaining module 210 configured to obtain a token ID of an OTP token and the OTP generated by the OTP token; and a first determining module 220 configured to determine whether the OTP token has been authenticated successfully.

Specifically, the first determining module 220 is configured to check for an authentication success time corresponding to the token ID in a database, if there is not the authentication success time corresponding to the token ID in the database or the authentication success time corresponding to the token ID in the database is a default value, it is determined that the OTP token has not been authenticated successfully; if the authentication success time corresponding to the token ID in the database is not the default value, it is determined that the OTP token has been authenticated successfully; or obtain an authentication ID corresponding to the token ID, and if value of the authentication ID is a first predetermined value, it is determined that the OTP token has not been authenticated successfully; if value of the authentication ID is a second predetermined value, it is determined that the OTP token has been authenticated successfully.

A second determining module 230 is configured to determine whether interval between the authentication success time corresponding to the token ID in the database and the current system time is longer than a second predetermined time length in case that the first determining module 220 determines that the token has been authenticated successfully.

A setting module 240 is configured to set size of the authentication window to be a first predetermined time length in case that the first determining module 220 determines that the OTP token has not been authenticated successfully; set size of the authentication window to be a third predetermined time length in case that the second determining module 230 determines that interval between the authentication success time and the current system time is longer than the second predetermined time length; set size of the authentication window to be a fourth predetermined time length in case that the second determining module 230 determines that interval between the authentication success time and the current system time is not longer than the second predetermined time length. The fourth predetermined time length is shorter than the third predetermined time length.

A first authenticating module 250 is configured to authenticate the obtained OTP according to the authentication window in case that the first determining module 220 determines that the OTP token has not been authenticated successfully.

Specifically, the first authentication module 250 is configured to compute OTPs according to time values in the authentication window and compare the computed OTPs with the obtained OTP respectively;

if OTP computed by a base time in the authentication window is identical to the obtained OTP, return authentication success information and set the authentication success time corresponding to the token ID to be the current system time; if there is not a token offset time in the database which corresponds to the token ID or the token offset time is a default value, set the base time to be the current system time; if the token offset time is not a default value, set the base time to be the current system time plus the token offset time corresponding to the token ID;

if the OTP computed by any other time value other than the base time in the authentication window is identical to the obtained OTP, return authentication success time, set both the authentication success time corresponding to the token ID and the calibration time to be the current system time, obtain a difference between time corresponding to the OTP, which is identical to the obtained OTP, in the computed OTPs and the current system time, and set the token offset time corresponding to the token ID to be the difference; and if all the computed OTPs are different from the obtained OTP, return authentication failure information or information of needing to calibrate the token.

A second authenticating module 260 is configured to authenticate the obtained OTP according to the authentication window and the authentication success time in case that the first determining module 220 determines that the OTP token has been authenticated successfully.

Specifically, the second authenticating module 260 is further configured to execute the following steps:

Step 4A, compute the OTP of last successful authentication according to the authentication success time, compare the computed OTP with the obtained OTP and determine whether they are identical, if yes, go to Step 4B; otherwise, go to Step 4D;

Step 4B, determine whether the authentication success time is in the authentication window, if yes, go to Step 4C; otherwise, go to Step 4D;

Step 4C, return and resend attack error information;

Step 4D, compute OTPs according to time values in the authentication window and compare the computed OTPs with the obtained OTP, respectively;

if OTP computed by the base time in the authentication window is identical to the obtained OTP, return authentication success information and set the authentication success time corresponding to the token ID to be the current system time;

if the OTP computed by any other time value other than the base time in the authentication window is identical to the obtained OTP, determine whether time corresponding to the OTP, which is identical to the obtained OTP, in the computed OTPs is longer than the authentication success time, if not, return exception information; if yes, search for a calibration time corresponding to the token ID, if the calibration time is not found, return authentication success information, set both the authentication success time and the calibration time to be the current system time, obtain a difference between time corresponding to the OTP which is identical to the obtained OTP in the computed OTPs and the current system time and set the token offset time corresponding to the token ID to be the difference; if the calibration time is found, determine whether interval between the current system time and the calibration time is longer than a calibration cycle, if yes, return authentication success information, set the authentication success time and the calibration time to be the current system time, obtain a difference between time corresponding to the OTP which is identical to the obtained OTP in the computed OTPs and the current system time and set the token offset time corresponding to the token ID to be the difference; otherwise, return the authentication success time and set the authentication success time corresponding to the token ID to be the current system time; and if the computed OTPs are all different from the obtained OTP, return authentication failure information and information of needing to calibrate the token.

If the authentication success time is not within the authentication window, the second authenticating module 260 is further configured to execute the following steps:

Step 5A, compute the OTP of last successful authentication according to the authentication success time, compare the computed OTP with the obtained OTP and determine whether they are identical, if yes, go to Step 5B; otherwise, go to Step 5D;

Step 5B, determine whether the authentication success time is within the authentication window, if yes, go to Step 5C; otherwise, go to Step 5D;

Step 5C, return and resend attack error information;

Step 5D, compute OTPs according to time values in the authentication window and compare the computed OTPs with the obtained OTP, respectively;

if the OTP computed by the base time in the authentication window is identical to the obtained OTP, return authentication success information and set the authentication success time corresponding to the token ID to be the current system time;

if the OTP computed by any other time value other than the base time in the authentication window is identical to the obtained OTP, check for calibration time corresponding to the token ID and if the calibration time is not found, return authentication success information, set both the authentication success time and the calibration time to be the current system time, obtain a difference between time corresponding to the OTP which is identical to the obtained OTP in the computed OTPs and the current system time and set the token offset time corresponding to the token ID to be the difference; if the calibration time is found, determine whether interval between the current system time and the calibration time is longer than a calibration cycle, if yes, return authentication success information, set both the authentication success time and the calibration time to be the current system time, obtain a difference between time corresponding to the OTP which is identical to the obtained OTP in the computed OTPs and the current system time and set the token offset time corresponding to the token ID to be the difference; otherwise, return authentication success information and set the authentication success time corresponding to the token ID to be the current system time; and if the computed OTPs are all different from the obtained OTP, return authentication failure information and information of needing to calibrate the token.

The second authenticating module 260 is further configured to execute the following steps:

Step 6A, compute the OTP of last successful authentication according to the authentication success time, compare the computed OTP with the obtained OTP and determine whether they are identical, if yes, go to Step 6B; otherwise, go to Step 6D;

Step 6B, determine whether the authentication success time is within the authentication window, if yes, go to Step 6C; otherwise, go to Step 6D;

Step 6C, return and resend attack error information

Step 6D, compute OTPs according to the time values in the authentication window and compare the computed OTP with the obtained OTP respectively, in which the time values in the authentication window are longer than the authentication success time;

if the OTP computed by the base time in the authentication window is identical to the obtained OTP, return authentication success information and set the authentication success time corresponding to the token ID to be the current system time;

if the OTP computed by any other time value other than the base time in the authentication window is identical to the obtained OTP, check for the calibration time corresponding to the token ID, and if the calibration time is not found, return authentication success information, set both the authentication success time and the calibration time to be the current system time, obtain a difference between time corresponding to the OTP which is identical to the obtained OTP in the computed OTPs and the current system time and set the token offset time corresponding to the token ID to be the difference; if the calibration time is found, determine whether interval between the current system time and the calibration time is longer than a calibration cycle, if yes, return authentication success information, set the authentication success time and the calibration time to be the current system time, obtain a difference between time corresponding to the OTP, which is identical to the obtained OTP, in the computed OTPs and the current system time and set the token offset time corresponding to the token ID to be the difference; otherwise, return authentication success time and set the authentication success time corresponding to the token ID to be the current system time; and if the computed OTPs are all different from the obtained OTP, return authentication failure information and information of needing to calibrate the token.

That the calibration time is not found includes that there is not the calibration time corresponding to the token ID in the database or the calibration time corresponding to the token ID in the database is a default value; and that the calibration time is found includes that the calibration time corresponding to the token ID in the database is not a default value.

In the technical solutions provided by the embodiments of the invention, the method further includes setting size of the authentication window according to whether the authentication success time and the interval between the authentication success time and the current system time are stored in the database and authenticating the obtained OTP according to the set authentication window ensure both the authentication success rate and the authentication security.

Steps used in the method of the embodiments of the invention can be executed directly by hardware, a processor-executable software or combination of them. The software can be installed on a random access memory, a memory, a read-only memory, an electrically programmable read only memory, an electrically erasable programmable read only memory, a register, a hard disk, a removable disk, a CD-ROM or any other form of storage media well known in the art.

The above mentioned are only preferred embodiments of the invention, not a limit to the scope of protection of the invention. Any modification or substitution easy to be thought of by those skilled in the art within scope of technology disclosed by the invention should be protected by the invention. Therefore, the scope of protection of the invention should be based on the claims of the invention.

The invention claimed is:
1. A method for authenticating an OTP, comprising:
Step 1, obtaining the OTP generated by an OTP token and ID of the OTP token;

Step 2, determining whether the OTP token is authenticated successfully, if no, going to Step 3; if yes, going to Step 4;

Step 3, setting size of an authentication window to be a first predetermined time length, computing an OTP by a time value selected from the authentication window and comparing the OTP computed with the OTP obtained to authenticate the obtained OTP;

Step 4, obtaining authentication success time corresponding to the token ID in a database, and determining whether a time interval between the authentication success time and the current system time is longer than a second predetermined time length, if yes, going to Step 5, otherwise, going to Step 6;

Step 5, setting size of the authentication window to be a third predetermined time length and authenticating the obtained OTP according to the authentication window and the authentication success time, in which an OTP is computed by a time value selected from the authentication window and compared with the OTP obtained, and the third predetermined time length is shorter than the first predetermined time length; and Step 6, setting size of the authentication window to be a fourth predetermined time length and authenticating the obtained OTP according to the authentication window and the authentication success time, in which an OTP is computed by a time value selected from the authentication window and compared with the OTP obtained, and the fourth predetermined time length is shorter than the third predetermined time length.

2. The method of claim 1, wherein
the determining whether the OTP token is authenticated successfully comprises:
searching for authentication success time in the database corresponding to the token ID, if there is not the authentication success time corresponding to the token ID in the database or if the authentication success time corresponding to the token ID in the database is a default value, determining that the OTP token is not authenticated successfully; if the authentication success time in the database corresponding to the token ID is not a default value, determining that the OTP token is authenticated successfully; or
obtaining an authentication ID corresponding to the token ID, if value of the authentication ID is a first predetermined value, determining that the OTP token is not authenticated successfully; if the authentication ID is a second predetermined value, determining that the OTP token is authenticated successfully.

3. The method of claim 1, wherein the authenticating the obtained OTP according to the authentication window comprises:
computing OTPs according to time values in the authentication window and comparing the computed OTPs with the obtained OTP respectively;
if the OTP computed by the base time in the authentication window is identical to the obtained OTP, returning authentication success information and setting the authentication success time corresponding to the token ID to be a current system time; if there is not offset time of the token corresponding to the token ID in the database, or if the token offset time is a default value, setting the base time to be the current system time; if the token offset time is not a default value, setting the base time to be the current system time plus the token offset time corresponding to the token ID;
if the OTP computed by any other time value other than the base time within the authentication window is identical to the obtained OTP, returning authentication success information, setting both the authentication success time corresponding to the token ID and the calibration time to be the current system time, obtaining a difference between time corresponding to the OTP which is identical to the obtained OTP in the computed OTPs and the current system time, and setting the token offset time corresponding to the token ID to be the difference; and
if the computed OTPs are all different from the obtained OTP, returning authentication failure information or information of needing to calibrate the token.

4. The method of claim 1, wherein the authenticating the obtained OTP according to the authentication window and the authentication success time comprises:
Step 4A, computing the OTP of last successful authentication according to the authentication success time, comparing the computed OTP with the obtained OTP, and determining whether they are identical, if they are identical, going to Step 4B; otherwise, going to Step 4D;
Step 4B, determining whether the authentication success time falls within the authentication window, if yes, going to Step 4C; otherwise, going to Step 4D;
Step 4C, returning and resending attack error information;
Step 4D, computing OTPs according to time values within the authentication window and comparing the computed OTPs with the obtained OTP respectively;
if the computed OTP according to the base time within the authentication window is identical to the obtained OTP, returning the authentication success information and setting the authentication success time corresponding to the token ID to be the current system time;
if a computed OTP according to any other time value other than the base time within the authentication window is identical to the obtained OTP, determining whether time corresponding to the OTP which is identical to the obtained OTP within the computed OTPs is longer than the authentication success time, if no, returning exception information; if yes, searching for calibration time corresponding to the token ID, if the calibration time is not searched successfully, returning authentication success information, setting the authentication success time and the calibration time to be the current system time and obtaining a difference between the time corresponding to the OTP which is identical to the obtained OTP within the computed OTPs and the current system time, and setting the token offset time corresponding to the token ID to be the difference; if the calibration time is searched successfully, determining whether the interval between the current system time and the calibration time is longer than a calibration cycle, if yes, returning authentication success information, setting the authentication success time and the calibration time to be the current system time, obtaining a difference between the time corresponding to the OTP that is identical to the obtained OTP within the computed OTPs and the current system time, and setting the token offset time corresponding to the token ID to the difference; otherwise, returning authentication success information and setting the authentication success time corresponding to the token ID to be the current system time; and
if the computed OTPs are all different from the obtained OTP, returning the authentication failure information or information of needing to calibrate the token.

5. The method of claim 1, wherein if the authentication success time does not fall within the authentication window, the authenticating the obtained OTP according to the authentication window and the authentication success time comprises:

Step 5A, computing the OTP of last successful authentication according to the authentication success time, comparing the computed OTP with the obtained OTP and determining whether they are identical, if yes, going to Step 5B; otherwise, going to Step 5D;

Step 5B, determining whether the authentication success time falls within the authentication window, if yes, going to Step 5C; otherwise, going to Step 5D;

Step 5C, returning and resending attack error information;

Step 5D, computing OTPs according to time values within the authentication window and comparing the computed OTP with the obtained OTP;

if the computed OTP according to the base time within the authentication window is identical to the obtained OTP, returning authentication success information and setting the authentication success time corresponding to the token ID to the current system time;

if the OTP computed according to any other time value other than the base time within the authentication window is identical to the obtained OTP, searching for calibration time corresponding to the token ID, if the calibration time is not searched successfully, returning authentication success information, setting the authentication success time and the calibration time to be the current system time, obtaining a difference between time corresponding to the OTP which is identical to the obtained OTP within the computed OTPs and the current system time, setting the token offset time corresponding to the token ID to the difference; if the calibration time is searched successfully, determining whether the interval between the current system time and the calibration time is longer than a calibration cycle, if yes, returning authentication success information, setting the authentication success time and the calibration time to be the current system time, obtaining a difference between time corresponding to the OTP, which is identical to the obtained OTP, within the OTPs computed and the current system time, setting the token offset time corresponding to the token ID to be the difference; otherwise, returning authentication success information and setting the authentication success time corresponding to the token ID to the current system time; and if the OTPs computed are all different from the obtained OTP, returning authentication failure information or information of needing to calibrate the token.

6. The method of claim 1, wherein the authenticating the OTP obtained according to the authentication window and the authentication success time comprises:

Step 6A, computing the OTP of last successful authentication according to the authentication success time and comparing the computed OTP with the obtained OTP and determining whether they are identical, if yes, going to Step 6B; otherwise, going to Step 6D;

Step 6B, determining whether the authentication success time falls within the authentication window, if yes, going to Step 6C; otherwise, going to Step 6D;

Step 6C, returning and resending attack error information;

Step 6D, computing OTPs according to time values within the authentication window and comparing the OTPs computed with the OTP obtained respectively in which time values within the authentication window are longer than the authentication success time;

if the OTP computed according to the base time within the authentication window is identical to the OTP obtained, returning authentication success information and setting the authentication success time corresponding to the token ID to the current system time;

if the OTP computed according to any other time other than the base time within the authentication window is identical to the obtained OTP, searching for a calibration time corresponding to the token ID, if the calibration time is not searched successfully, returning authentication success information, setting the authentication success time and the calibration time to be the current system time, obtaining a difference between time corresponding to the OTP that is identical to the OTP obtained within the computed OTPs and the current system time and setting the token offset time corresponding to the token ID to be the difference; if the calibration time is searched successfully, determining whether interval between the current system time and the calibration time is longer than the calibration cycle, if yes, returning authentication success information, setting the authentication success time and the calibration time to be the current system time, obtaining the difference between time corresponding to the OTP that is identical to the OTP obtained within the OTPs computed and the current system time and setting the token offset time corresponding to the token ID to be the difference; otherwise, returning authentication success time and setting the authentication success time corresponding to the token ID to be the current system time; and if all OTPs computed are all different from the OTP obtained, returning authentication failure information or information of needing to calibrate the token.

7. The method of claim 4, wherein that the calibration time is not searched successfully comprises that there is not the calibration time corresponding to the token ID in the database, or the calibration time corresponding to the token ID in the database is a default value; and that the calibration time is searched successfully comprises that the calibration time corresponding to the token ID in the database is not a default value.

8. The method of claim 5, wherein that the calibration time is not searched successfully comprises that there is not the calibration time corresponding to the token ID in the database, or the calibration time corresponding to the token ID in the database is a default value; and that the calibration time is searched successfully comprises that the calibration time corresponding to the token ID in the database is not a default value.

9. The method of claim 6, wherein that the calibration time is not searched successfully comprises that there is not the calibration time corresponding to the token ID in the database, or the calibration time corresponding to the token ID in the database is a default value; and that the calibration time is searched successfully comprises that the calibration time corresponding to the token ID in the database is not a default value.

10. An instrument of authenticating an OTP, characterized in that, said instrument comprises:

an obtaining module configured to obtain a token ID of an OTP token and the OTP generated by the OTP token;

a first determining module configured to determine whether the OTP token has been authenticated successfully;

a second determining module configured to determine whether an interval between authentication success time corresponding to the token ID in the database and the current system time is longer than a second predetermined time in case that the first determining module determines that the OTP token has been authenticated successfully;

a setting module configured to set size of an authentication window to be a first predetermined time length in case that the first determining module determines that the OTP token has not been authenticated successfully; to set size of the authentication window to be a third predetermined time length in case that the second determining module determines that interval between the authentication success time and the current system time is longer than a second predetermined time length; to set size of the authentication window to be a fourth predetermined time length in case that the second determining module determines that interval between the authentication success time and the current system time is not longer than the second predetermined time length, in which the fourth predetermined time length is shorter than the third predetermined time length;

a first authenticating module configured to compute an OTP by a time value selected from the authentication window and compare the OTP computed with the OTP obtained to authenticate the obtained OTP in case that the first determining module determines that the OTP has not been authenticated successfully; and a second authenticating module configured to authenticate the OTP obtained according to the authentication window and the authentication success time in which an OTP is computed by a time value selected from the authentication window and compared with the OTP obtained in case that the first determining module determines that the OTP token has been authenticated successfully wherein the said obtaining module, first determining module, second determining module, setting module, first authenticating module, and second authenticating module are installed on storage media and can be executed directly by hardware.

11. The instrument of claim 10, wherein
the first determining module is configured to
inquire whether there is authentication success time corresponding to the token ID in the database, if there is not the authentication success time corresponding to the token ID in the database or the authentication success time corresponding to the token ID in the database is a default value, determine that the OTP token has not been authenticated successfully; while if the authentication success time corresponding to the token ID in the database is not the default value, determine that the OTP token has been authenticated successfully, or obtain an authentication ID corresponding to the token ID, if value of the authentication ID is a first predetermined value, determine that the OTP token has not been authenticated successfully, while if value of the authentication ID is a second predetermined value, determine that the OTP token has been authenticated successfully.

12. The instrument of claim 10, wherein
the first authenticating module is configured to
compute OTPs according to time values in the authentication window and compare the OTPs computed with the OTP obtained;

if the OTP computed according to a base time in the authentication window is identical to the OTP obtained, return an authentication success information and set the authentication success time corresponding to the token ID to be the current system time; if there is not token offset time corresponding to the token ID in the database or if the token offset time is a default time, the base time is identical to the current system time; if the token offset time is not the default value, the base time is the current system time plus the token offset time corresponding to the token ID;

if the OTP computed according to any other time value other than the base time in the authentication window is identical to the OTP obtained, return the authentication success time, set the authentication success time corresponding to the token ID and the calibration time to be the current system time, obtain a difference between time corresponding to the OTP that is identical to the OTP obtained in the OTPs computed and the current system time and set the token offset time corresponding to the token ID to be the difference; and if the OTPs computed are all different from the OTP obtained, return authentication failure information or information of needing to calibrate the token.

13. The instrument of claim 10, wherein
the second authenticating module is configured to perform the following steps:

Step 4A, computing the OTP of last successful authentication according to the authentication success time and comparing the OTP computed with the OTP obtained, determining whether they are identical, if yes, going to Step 4B; otherwise, going to Step 4D;

Step 4B, determining whether the authentication success time is within the authentication window, if yes, going to Step 4C; otherwise, going to Step 4D;

Step 4C, returning and resending attack error information;

Step 4D, computing OTPs according to time values in the authentication window and comparing the OTPs computed with the OTP obtained respectively;

if the OTP computed according to the base time in the authentication window is identical to the OTP obtained, returning authentication success information and setting the authentication success time corresponding to the token ID to be the current system time;

if the OTP computed according to any other time value other than the base time in the authentication window is identical to the OTP obtained, determining whether time corresponding to the OTP which is identical to the OTP obtained in the OTPs computed is longer than the authentication success time, if not, returning exception information; if yes, searching a calibration time corresponding to the token ID, if the calibration time is not searched successfully, returning authentication success information, setting the authentication success time and the calibration time to be the current system time, obtaining a difference between time corresponding to the OTP which is identical to the OTP obtained in the OTPs computed and the current system time and setting a token offset time corresponding to the token ID to be the difference; if the calibration time is searched successfully, determining whether interval between the current system time and the calibration time is longer than a calibration cycle, if yes, returning authentication success information, setting the authentication success time and the calibration time to be the current system time, obtaining a difference between the time corresponding to the OTP which is identical to the OTP obtained in the OTPs computed and setting the token offset time corresponding to the token ID to be the difference; otherwise, returning authentication success information and setting the authentication success time corresponding to the token ID to be the current system time; and if the OTPs computed are all different from the OTP obtained, returning authentication failure information or information of needing to calibrate the token.

14. The instrument of claim 10, wherein if the authentication success time is not within the authentication window, the second authenticating module is configured to perform the following steps:

Step 5A, computing the OTP of last successful authentication according to the authentication success time and comparing the OTPs computed with the OTP obtained respectively, if yes, going to Step 5B; otherwise going to Step 5D;

Step 5B, determining whether the authentication success time is within the authentication window, if yes, going to Step 5C; otherwise, going to Step 5D;

Step 5C, returning and resending attack error information;

Step 5D, computing OTPs according to time values in the authentication window and comparing the OTP computed with the OTP obtained;

if the OTP computed according to the base time within the authentication window is identical to the OTP obtained, returning authentication success information and setting the authentication success time corresponding to the token ID to be the current system time;

if the OTP computed according to any other time value other than the base time in the authentication window is identical to the OTP obtained, searching calibration time corresponding to the token ID, if the calibration time is not searched successfully returning authentication success information, setting the authentication success time and calibration time to be the current system time, obtaining a difference between time corresponding to the OTP that is identical to the OTP obtained in the OTPs computed and the current system time and setting the token offset time corresponding to the token ID to be the difference; if the calibration time is searched successfully, determining whether the interval between the current system time and the calibration time is longer than a calibration cycle, if yes, returning authentication success information, setting the authentication success time and the calibration time to be the current system time, obtaining a difference between time corresponding to the OTP which is identical to the OTP obtained in the OTPs computed and the current system time and setting the token offset time corresponding to the token ID to be the difference; otherwise, returning authentication success information and setting the authentication success time corresponding to the token ID to be the current system time; and if the OTPs computed are different from the OTP obtained respectively, returning authentication failure information or information of needing to calibrate the token.

15. The instrument of claim 10, wherein the second authenticating module is configured to perform the following steps:

Step 6A, computing the OTP of last successful authentication according to the authentication success time and comparing the OTP computed with the OTP obtained, if yes, going to Step 6B; otherwise, going to Step 6D;

Step 6B, determining whether the authentication success time is within the authentication window, if yes, going to Step 6C; otherwise, going to Step 6D;

Step 6C, returning and resending attack error information;

Step 6D, computing OTPs according to time values within the authentication window and comparing the OTPs computed with the OTP obtained respectively, in which time values within the authentication window are longer than the authentication success time;

if the OTP computed according to the base time within the authentication window is identical to the OTP obtained, returning authentication success information and setting the authentication success time corresponding to the token ID to be the current system time;

if the OTP computed according to any other time value other than the base time within the authentication window is identical to the OTP obtained, searching a calibration time corresponding to the token ID, if the calibration time is not searched successfully, returning authentication success information, setting the authentication success time and the calibration time to be the current system time, obtaining a difference between time corresponding to the OTP which is identical to the OTP obtained in the OTPs computed and the current system time and setting the token offset time corresponding to the token ID to be the difference; if the calibration time is searched successfully, determining whether interval between the current system time and the calibration time is longer than a calibration cycle, if yes, returning authentication success information, setting the authentication success time and the calibration time to be the current system time, obtaining a difference between time corresponding to the OTP which is identical to the OTP obtained in the OTPs computed and the current system time and setting the token offset time corresponding to the token ID to be the difference; otherwise, returning authentication success information and setting the authentication success time corresponding to the token ID to be the current system time; and if the OTPs computed are all different from the OTP obtained, returning authentication failure information or information of needing to calibrate the token.

16. The instrument of claim 13, wherein that the calibration time is not searched successfully comprises that there is not the calibration time corresponding to the token ID in the database, or the calibration time corresponding to the token ID in the database is a default value; and that the calibration time is searched successfully comprises that the calibration time corresponding to the token ID in the database is not a default value.

17. The instrument of claim 14, wherein that the calibration time is not searched successfully comprises that there is not the calibration time corresponding to the token ID in the database, or the calibration time corresponding to the token ID in the database is a default value; and that the calibration time is searched successfully comprises that the calibration time corresponding to the token ID in the database is not a default value.

18. The instrument of claim 15, wherein that the calibration time is not searched successfully comprises that there is not the calibration time corresponding to the token ID in the database or the calibration time corresponding to the token ID in the database is a default value; and that the calibration time is searched successfully comprises that the calibration time corresponding to the token ID in the database is not a default value.

* * * * *